(12) United States Patent
Samuel et al.

(10) Patent No.: US 9,156,215 B2
(45) Date of Patent: Oct. 13, 2015

(54) METHOD FOR MAKING SILICONE HYDROGEL CONTACT LENSES

(75) Inventors: Newton T. Samuel, Suwanee, GA (US); Horngyih Huang, Alpharetta, GA (US); Daqing Wu, Suwanee, GA (US); Uwe Haken, Norcross, GA (US); John Dallas Pruitt, Suwanee, GA (US); Angelika Maria Domschke, Duluth, GA (US); Yasuo Matsuzawa, Roswell, GA (US)

(73) Assignee: Novartis AG, Basel (CH)

( * ) Notice: Subject to any disclaimer, the term of this patent is extended or adjusted under 35 U.S.C. 154(b) by 984 days.

(21) Appl. No.: 13/309,654

(22) Filed: Dec. 2, 2011

(65) Prior Publication Data

US 2012/0139138 A1 Jun. 7, 2012

Related U.S. Application Data

(60) Provisional application No. 61/420,077, filed on Dec. 6, 2010.

(51) Int. Cl.
*B29D 11/00* (2006.01)
*G02B 1/04* (2006.01)

(52) U.S. Cl.
CPC .......... *B29D 11/00153* (2013.01); *G02B 1/043* (2013.01)

(58) Field of Classification Search
USPC ............ 264/1.1, 1.26, 1.38, 2.5, 2.6; 425/808
IPC ............................. B29D 11/00153; G02B 1/043
See application file for complete search history.

(56) References Cited

U.S. PATENT DOCUMENTS

| | | | |
|---|---|---|---|
| 4,136,250 A | 1/1979 | Mueller |
| 4,153,641 A | 5/1979 | Deichert |
| 4,182,822 A | 1/1980 | Chang |
| 4,189,546 A | 2/1980 | Deichert |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,276,402 A | 6/1981 | Chromecek |
| 4,327,203 A | 4/1982 | Deichert |
| 4,341,889 A | 7/1982 | Deichert |
| 4,343,927 A | 8/1982 | Chang |
| 4,355,147 A | 10/1982 | Deichert |
| 4,486,577 A | 12/1984 | Mueller |
| 4,543,398 A | 9/1985 | Bany |
| 4,605,712 A | 8/1986 | Mueller |
| 4,661,575 A | 4/1987 | Tom |
| 4,684,538 A | 8/1987 | Klemarczyk |
| 4,703,097 A | 10/1987 | Wingler |
| 4,833,218 A | 5/1989 | Lee |
| 4,837,289 A | 6/1989 | Mueller |
| 4,954,586 A | 9/1990 | Toyoshima |
| 4,954,587 A | 9/1990 | Mueller |
| 5,010,141 A | 4/1991 | Mueller |
| 5,034,461 A | 7/1991 | Lai |
| 5,039,761 A | 8/1991 | Ono |
| 5,070,170 A | 12/1991 | Robertson |
| 5,079,319 A | 1/1992 | Mueller |
| 5,145,977 A | 9/1992 | Petroff |
| 5,346,946 A | 9/1994 | Yokoyama |
| 5,358,995 A | 10/1994 | Lai |
| 5,387,632 A | 2/1995 | Lai |
| 5,416,132 A | 5/1995 | Yokoyama |
| 5,451,617 A | 9/1995 | Lai |
| 5,486,579 A | 1/1996 | Lai |
| 5,508,317 A | 4/1996 | Müller |
| 5,527,925 A | 6/1996 | Chabrecek |
| 5,612,389 A | 3/1997 | Chabrecek |
| 5,612,391 A | 3/1997 | Chabrecek |
| 5,621,018 A | 4/1997 | Chabrecek |
| 5,760,100 A | 6/1998 | Nicolson |
| 5,789,464 A | 8/1998 | Müller |
| 5,849,810 A | 12/1998 | Müller |
| 5,962,548 A | 10/1999 | Vanderlaan |
| 5,981,675 A | 11/1999 | Valint, Jr. |
| 6,039,913 A | 3/2000 | Hirt |
| 6,627,124 B1 | 9/2003 | Herbrechtsmeier |
| 6,762,264 B2 | 7/2004 | Künzler |
| 6,800,225 B1 | 10/2004 | Hagmann |
| 7,091,283 B2 | 8/2006 | Müller |
| 7,238,750 B2 | 7/2007 | Müller |
| 7,268,189 B2 | 9/2007 | Müller |
| 7,279,503 B1 | 10/2007 | O'Lenick |
| 7,384,590 B2 | 6/2008 | Kelly |
| 7,387,759 B2 | 6/2008 | Kelly |
| 7,521,519 B1 | 4/2009 | Hirt |
| 8,003,710 B2 | 8/2011 | Medina |
| 8,071,658 B2 | 12/2011 | Zhou |
| 8,071,703 B2 | 12/2011 | Zhou |
| 2003/0013808 A1 | 1/2003 | Tonge |
| 2007/0182918 A1 | 8/2007 | Vanderlaan |
| 2007/0242219 A1 | 10/2007 | Zanini |
| 2008/0015315 A1 | 1/2008 | Chang |
| 2008/0143003 A1 | 6/2008 | Phelan |
| 2010/0022660 A1 | 1/2010 | Wegner |

OTHER PUBLICATIONS

PCT International Search Report dated Feb. 15, 2012, International Application No. PCT/US2011/062986, International Filing Date Dec. 2, 2011.

PCT Written Opinion of the International Searching Authority dated Feb. 15, 2012, International Application No. PCT/US2011/062986, International Filing Date Dec. 2, 2011.

*Primary Examiner* — Mathieu Vargot

(74) *Attorney, Agent, or Firm* — Jian Zhou

(57) ABSTRACT

The invention provides a method for washing, with a water-based system, reusable molds for making silicone hydrogel contact lenses. The water-based washing system comprises an ethoxylated silicone polyether surfactant. The water-based system of the invention can effectively wash away silicone-containing components and other components of a lens formulation left behind on the molding surfaces of a reusable mold, after removing a silicone hydrogel contact lens cast molded in the reusable mold.

15 Claims, No Drawings

METHOD FOR MAKING SILICONE HYDROGEL CONTACT LENSES

This application claims the benefit under 35 USC §119 (e) of U.S. provisional application No. 61/420,077 filed Dec. 6, 2010, incorporated herein by reference in its entirety.

The present invention is related to a method for making silicone hydrogel contact lenses, in particular, a method for in-line cleaning of reusable molds for making silicone hydrogel contact lenses under spatial limitation of actinic radiation.

BACKGROUND

In recent years, soft silicone hydrogel contact lenses become more and more popular because of their high oxygen permeability and comfort. However, all commercially available silicone hydrogel contact lenses are produced according to a conventional cast molding technique involving use of disposable plastic molds and a mixture of monomers in the presence or absence of macromers. However, disposable plastic molds inherently have unavoidable dimensional variations, because, during injection-molding of plastic molds, fluctuations in the dimensions of molds can occur as a result of fluctuations in the production process (temperatures, pressures, material properties), and also because the resultant molds may undergo non-uniformly shrinking after the injection molding. These dimensional changes in the mold may lead to fluctuations in the parameters of contact lenses to be produced (peak refractive index, diameter, basic curve, central thickness etc.) and to a low fidelity in duplicating complex lens design.

Such disadvantages encountered in a conventional cast-molding technique can be overcome by using the so-called Lightstream Technology™ (CIBA Vision), as illustrated in U.S. Pat. Nos. 5,508,317, 5,789,464, 5,849,810, and 6,800,225, which are incorporated by reference in their entireties. The Lightstream Technology™ involves (1) a lens-forming composition which is typically a solution of one or more substantially purified prepolymer with ethylenically unsaturated groups and which generally is substantially free of monomers and crosslinking agents with a small molecular weight, (2) reusable molds produced in high precision, (3) curing under a spatial limitation of actinic radiation (e.g., UV); and washing and reusing the reusable molds. Lenses produced according to the Lightstream Technology™ can have high consistency and high fidelity to the original lens design, because of use of reusable, high precision molds. In addition, contact lenses with high quality can be produced at relatively lower cost due to the short curing time and a high production yield.

But, the Lightstream Technology™ has not been applied to make silicone hydrogel contact lenses. One potential issue in the manufacture of silicone hydrogel contact lenses based on Lightstream Technology™ is that the silicone-containing components of a lens formulation left behind on the mold surface may not be water soluble and an organic solvent may have to be used to wash the reusable molds. However, use of organic solvents can be costly and is not environmentally friendly. A water-based mold washing system is desirable. Therefore, there is still a need for a method for washing, with a water-based system, reusable molds for making silicone hydrogel contact lenses according to the Lightstream Technology™.

SUMMARY OF THE INVENTION

In one aspect, the invention provides a method for producing silicone hydrogel contact lenses, involving use of a reusable mold for cast-molding silicone hydrogel contact lenses and a step of cleaning/washing the reusable mold with a water-based solution containing a silicone surfactant which is an ethoxylated water-soluble silicone polyether.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" or "hydrogel material" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

"Hydrophilic," as used herein, describes a material or portion thereof that will more readily associate with water than with lipids.

A "vinylic monomer" refers to a low molecular weight compound that has one sole ethylenically unsaturated group. Low molecular weight typically means average molecular weights less than 700 Daltons.

The term "olefinically unsaturated group" or "ethylenicaly unsaturated group" is employed herein in a broad sense and is intended to encompass any groups containing a >C=C< group. Exemplary ethylenically unsaturated groups include without limitation acryloyl, methacryloyl, allyl, vinyl, styrenyl, or other C=C containing groups.

The term "(meth)acrylamide" refers to methacrylamide and/or acrylamide.

The term "(meth)acrylate" refers to methacrylate and/or acrylate.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionizing radiation (e.g. gamma ray or X-ray irradiation), microwave irradiation, and the like. Thermal curing or actinic curing methods are well-known to a person skilled in the art.

A "polysiloxane-containing vinylic monomer or macromer" refers to a vinylic monomer or macromer containing one sole ethylenically unsaturated group and a divalent radical of linear segment

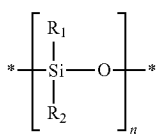

in which $R_1$ and $R_2$ are independently a monovalent $C_1$-$C_{10}$ alkyl, a monovalent $C_1$-$C_{10}$ aminoalkyl, a monovalent of $C_1$-$C_{10}$ hydroxyalkyl, $C_1$-$C_{10}$ ether, $C_1$-$C_{10}$ fluoroalkyl, $C_1$-$C_{10}$ fluoroether or $C_6$-$C_{18}$ aryl radical, -alk-(OCH$_2$CH$_2$)$_m$—OR$_3$, in which alk is $C_1$-$C_6$ alkylene divalent radical, $R_3$ is hydrogen or $C_1$-$C_6$ alkyl, and m is an integer of from 1 to 10; n is an integer of 2 or higher.

A "siloxane-containing vinylic monomer" refers to a vinylic monomer that comprises one sole ethylenically-unsaturated group and a radical of

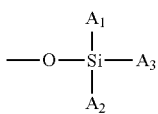

in which $A_1$, $A_2$ and $A_3$ independent of each other are $C_1$-$C_{12}$ alkyl which is linear or branched and optionally substituted or terminated with C1-C4 alkoxy, hydroxyl, or amino group, phenyl, or benzyl.

The term "fluid" as used herein indicates that a material is capable of flowing like a liquid.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "vinylic macromer" refers to a medium and high molecular weight compound which comprises one sole ethylenically unsaturated groups. Medium and high molecular weight typically means average molecular weights greater than 700 Daltons.

A "prepolymer" refers to a starting polymer which contains two or more ethylenically unsaturated groups and can be cured (e.g., crosslinked) actinically to obtain a crosslinked polymer having a molecular weight much higher than the starting polymer.

A "silicone-containing prepolymer" refers to a prepolymer which contains silicone.

A "crosslinker" refers to a compound having at least two ethylenically-unsaturated groups. A "crossliking agent" refers to a compound which belongs to a subclass of crosslinkers and comprises at least two ethylenically unsaturated groups and has a molecular weight of 700 Daltons or less.

"Molecular weight" of a polymeric material (including monomeric or macromeric materials), as used herein, refers to the weight-average molecular weight unless otherwise specifically noted or unless testing conditions indicate otherwise.

"Polymer" means a material formed by polymerizing one or more monomers.

As used herein, the term "ethylenically functionalized" in reference to a copolymer or a compound is intended to describe that one or more actinically crosslinkable groups have been covalently attached to a copolymer or compound through the pendant or terminal functional groups of the copolymer or the compound according to a coupling process.

As used herein, the term "multiple" refers to three or more.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV radiation is obtained by using a mask or screen having a radiation (e.g.,UV) permeable region, a radiation (e.g., UV) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV radiation) having a cross-sectional profile defined by the projection contour of the mask or screen. The projected beam of radiation (e.g., UV radiation) limits radiation (e.g., UV radiation) impinging on a lens-forming material located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV beam (i.e., a spatial limitation of radiation). The radiation used for the crosslinking is a radiation energy, especially UV radiation, gamma radiation, electron radiation or thermal radiation, the radiation energy preferably being in the form of a substantially parallel beam in order on the one hand to achieve good restriction and on the other hand efficient use of the energy.

In the conventional cast-molding process, the first and second molding surface of a mold are pressed against each other to form a circumferential contact line which defines the edge of a result contact lens. Because the close contact of the molding surfaces can damage the optical quality of the molding surfaces, the mold cannot be reused. In contrast, in the Lightstream Technology™, the edge of a resultant contact lens is not defined by the contact of the molding surfaces of a mold, but instead by a spatial limitation of radiation. Without any contact between the molding surfaces of a mold, the mold can be used repeatedly to produce high quality contact lenses with high reproducibility.

In general, the invention is directed to a method for making silicone hydrogel contact lenses based on the Lightstream Technology™. The invention is partly based on the discovery that ethoxylated water-soluble silicone polyethers can be used as a surfactant in a water-based solution to effectively clean/wash resuable molds involved in cast-molding of silicone hydrogel contact lenses. It is believed that an ethoxylated silicone polyether can facilitate the dissolution of silicone-containing components of a silicone hydrogel lens formulation in water and/or fine dispersion of such silicone-containing component in water.

The invention provides a method for producing silicone hydrogel contact lenses. The method comprises the steps of: (1) providing a reusable mold for making soft contact lenses, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; (2) introduce a fluid polymerizable composition into the cavity, wherein the fluid polymerizable composition comprises at least one silicone-containing lens-forming material selected from the group consisting of a siloxane-containing vinylic monomer, a polysiloxane-containing vinylic monomer, a polysiloxane-containing macromer, a polysiloxane-containing crosslinker, an actinically-crosslinkable silicone-containing prepolymer, and a mixture thereof; (3) irradiating, under a spatial limitation of actinic radiation, the fluid composition in the mold for a time period of about 200 seconds or less, so as to form a silicone hydrogel contact lens, wherein the formed silicone hydrogel contact lens comprises an anterior surface defined by the first molding surface, an opposite posterior surface defined by the second molding surface, and a lens edge defined by the spatial limitation of actinic radiation; (4) opening the mold and removing the formed silicone hydrogel contact lens from the mold; (5) removing the silicone-containing lens forming material and other components of the fluid composition left behind on the first and second molding surfaces of the mold by washing the first and second molding surfaces of the reusable mold with a water-based solution containing from about 0.01% to about 2.5% by weight of a silicone surfactant, wherein the silicone surfactant is an ethoxylated water-soluble silicone polyether; and (6) repeating the steps (2) to (5).

Examples of reusable molds suitable for spatial limitation of radiation include without limitation those disclosed in U.S. Pat. Nos. 6,800,225, 6,627,124, 7,384,590, and 7,387,759, which are incorporated by reference in their entireties.

For example, a preferred reusable mold comprises a first mold half having a first molding surface and a second mold half having a second molding surface. The two mold halves of the preferred reusable mold are not touching each other, but there is a thin gap of annular design arranged between the two mold halves. The gap is connected to the mold cavity formed between the first and second molding surfaces, so that excess monomer mixture can flow into the gap. It is understood that gaps with any design can be used in the invention.

In a preferred embodiment, at least one of the first and second molding surfaces is permeable to a crosslinking radiation, e.g., UV radiation). More preferably, one of the first and second molding surfaces is permeable to a crosslinking radiation (e.g., UV radiation) while the other molding surface is poorly permeable to the crosslinking radiation (e.g., UV radiation). For example, one of the mold halves can be made of a UV-permeable material, while the other mold half can be made of a material containing UV absorbing materials, such as, for example carbon black, as described in U.S. Pat. Nos. 7,387,759 and 7,384,590.

The reusable mold preferably comprises a mask which is fixed, constructed or arranged in, at or on the mold half having the radiation-permeable molding surface. The mask is impermeable or at least of poor permeability compared with the permeability of the radiation-permeable molding surface. The mask extends inwardly right up to the mold cavity and surrounds the mold cavity so as to screen all areas behind the mask with the exception of the mold cavity.

Where the curing radiation is UV light, the mask may preferably be a thin chromium layer, which can be produced according to processes as known, for example, in photo and UV lithography. Other metals or metal oxides may also be suitable mask materials. The mask can also be coated with a protective layer, for example of silicon dioxide if the material used for the mould or mould half is quartz.

Alternatively, the mask can be a masking collar made of a material comprising a UV-absorber and substantially blocks curing energy therethrough as described in U.S. Pat. No. 7,387,759 (incorporated by reference in its entirety). In this preferred embodiment, the mold half with the mask comprises a generally circular disc-shaped transmissive portion and a masking collar having an inner diameter adapted to fit in close engagement with the transmissive portion, wherein said transmissive portion is made from an optically clear material and allows passage of curing energy therethrough, and wherein the masking collar is made from a material comprising a UV-blocker and substantially blocks passage of curing energy therethrough, wherein the masking collar generally resembles a washer or a doughnut, with a center hole for receiving the transmissive portion, wherein the transmissive portion is pressed into the center opening of the masking collar and the masking collar is mounted within a bushing sleeve.

Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N. J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc. Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual molding surfaces, damage as a result of contact is ruled out. This ensures a high service life of the molds, which, in particular, also ensures high reproducibility of the contact lenses to be produced and high fidelity to the lens design.

Any suitable siloxane-containing vinylic monomers can be used in the invention. Examples of preferred siloxane-containing vinylic monomers include without limitation N-[tris(trimethylsiloxy)silylpropyl](meth)acrylamide, N-[tris(dimethylpropylsiloxy)silylpropyl](meth)acrylamide, N-[tris(dimethylphenylsiloxy)silylpropyl]acrylamide, N-[tris(dimethylphenylsiloxy)silylpropyl](meth)acrylamide, N-[tris(dimethylethylsiloxy)silylpropyl](meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl]acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide; 3-methacryloxy propylpentamethyldisiloxane, tris(trimethylsilyloxy)silylpropyl(meth)acrylate, (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)-propyloxy)propylbis(trimethylsiloxy)methylsilane, N-2-methacryloxyethyl-O-(methyl-bis-trimethylsiloxy-3-propyl)silyl carbamate, 3-(trimethylsilyl)propylvinyl carbonate, 3-(vinyloxycarbonylthio)propyl-tris (trimethyl-siloxy)silane, 3-[tris(trimethylsiloxy)silyl]propylvinyl carbamate, 3-[tris(trimethylsiloxy)silyl]propyl allyl carbamate, 3-[tris(trimethylsiloxy)silyl]propyl vinyl carbonate, t-butyldimethyl-siloxyethyl vinyl carbonate; trimethylsilylethyl vinyl carbonate, trimethylsilylmethyl vinyl carbonate; and combinations thereof. Most preferred siloxane-containing (meth)acrylamide monomers are N-[tris(trimethylsiloxy)silylpropyl]acrylamide, tris(trimethylsilyloxy)silylpropyl(meth)acrylate, N-[tris(trimethylsiloxy)silylpropyl](meth)acrylamide, 3-methacryloxy-2-hydroxypropyloxy)propyl-bis(trimethylsiloxy)methylsilane, or combinations thereof.

Any suitable polysiloxane-containing vinylic macromers and crosslinkers can be used in the invention. Examples of preferred polysiloxane-containing vinylic monomers or macromers and polysiloxane-containing crosslinkers include without limitation mono-(meth)acrylate-terminated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane); mono-vinyl-terminated, mono-vinyl carbonate-terminated or mono-vinyl carbamate-terminated polydimethylsiloxanes of various molecular weight; di-(meth)acrylated polydimethylsiloxanes (or so called polysiloxane crosslinkers) of various molecular weight; di-vinyl carbonate-terminated polydimethylsiloxanes (polysiloxane crosslinkers); di-vinyl carbamate-terminated polydimethylsiloxane (polysiloxane crosslinkers); di-vinyl terminated polydimethylsiloxanes (polysiloxane crosslinkers); di-(meth)acrylamide-terminated polydimethylsiloxanes (polysiloxane crosslinkers); bis-3-methacryloxy-2-hydroxypropyloxypropyl polydimethylsiloxane (polysiloxane crosslinker); N,N,N',N'-tetrakis(3-methacryloxy-2-hydroxypropyl)-alpha, omega-bis-3-aminopropyl-polydimethylsiloxane (polysiloxane crosslinkers); polysiloxanylalkyl (meth)acrylic monomers; the reaction products of glycidyl methacrylate with amino-functional polydimethylsiloxanes; hydroxyl-containing polysiloxane vinylic monomers or crosslinkerss; polysiloxane-containing macromer selected from the group consisting of Macromer A, Macromer B, Macromer C, and Macromer D described in U.S. Pat. No. 5,760,100 (herein incorporated by reference in its entirety); the reaction products of glycidyl methacrylate with amino-functional polydimethylsiloxanes; hydroxyl-functionalized siloxane-containing vinylic monomers or macromers; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264 (here incorporated by reference in their entireties); polysiloxane-containing macromers disclosed in U.S. Pat. Nos. 4,259,467, 4,260,725, and 4,261,875 (herein incorporated by reference in their entireties). Di and triblock macromers consisting of polydimethylsiloxane and polyalkyleneoxides could also be of utility. For example one might use methacrylate end capped polyethyleneoxide-block-polydimethylsiloxane-block-polyethyleneoxide to enhance oxygen permeability. Suitable monofunctional hydroxyl-functionalized siloxane-containing vinylic monomers/macromers and suitable multifunctional hydroxyl-functionalized siloxane-containing vinylic monomers/macromers are commercially available from Gelest, Inc, Morrisville, Pa.

A polysiloxane-containing vinylic macromer can be prepared according to any known procedures, for example, those described in U.S. Pat. Nos. 4,136,250, 4,486,577, 4,605,712, 5,034,461, 5,416,132, and 5,760,100, herein incorporated by reference in their entireties.

Any suitable silicone-containing actinically-crosslinkable prepolymers can be used in the invention. Examples of preferred silicone-containing actinically-crosslinkable prepolymers include without limitation those described in U.S. Pat. Nos. 6,039,913, 7,091,283, 7,268,189 and 7,238,750, and in U.S. patent application Ser. Nos. 09/525,158, 11/825,961, 12/001,562, 12/001,521, 12/077,772, 12/077,773, which are incorporated herein by references in their entireties.

Any ethoxylated water-soluble silicone polyethers can be used in the invention so long as they can facilitate dissolving or dispersing of both a siloxane-containing vinylic monomer and a polysiloxane-containing vinylic monomer or macromer or crosslinker according to the procedures described in Example 2. Preferably, an ethoxylated water-soluble silicone polyether is a linear block copolymer of polyethylenglycol (PEG) with polydimethylsiloxane (or lineal PEG dimethicone) of formula (1), a pendant PEG dimethicone of formula (2), or a silicone glycol of formula (3)

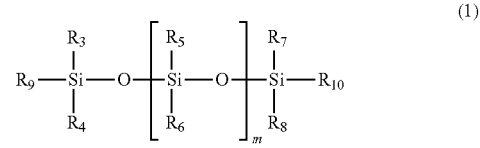

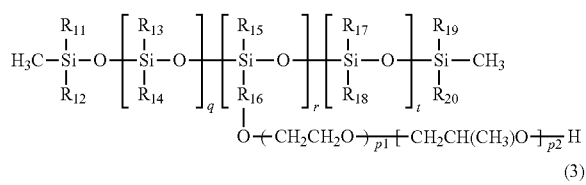

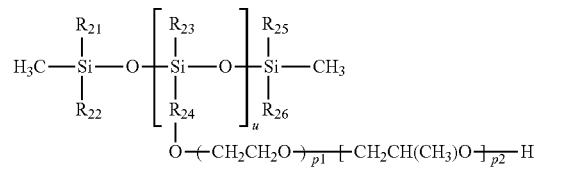

In which:
R$_3$, R$_4$, R$_5$, R$_6$, R$_7$, R$_8$, R$_{11}$, R$_{12}$, R$_{13}$, R$_{14}$, R$_{15}$, R$_{18}$, R$_{19}$, R$_{20}$, R$_{21}$, R$_{22}$, R$_{23}$, R$_{25}$, and R$_{26}$, independent of one another are CH$_3$ or CH$_2$CH$_3$, preferably CH$_3$;
R$_9$ and R$_{10}$ independent of each other are a monovalent radical of

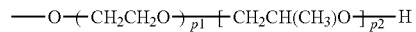

in which p1 is an integer of 6 to 12, preferably 8 to 10, more preferably 8, and p2 is 0 to 8;
R$_{16}$, and R$_{24}$ independent of one another are divalent radical of —(CH$_2$)$_a$— in which a is an integer of 1 to 5, preferably 2 or 3, more preferably 3;
R$_{17}$ is CH$_3$ or a monovalent radical of —(CH$_2$)$_b$—CH$_3$ in which b is an integer from 9 to 15, preferably 11 to 13, more preferably 11;

p1 is an integer of 6 to 12, preferably 8 to 10, more preferably 8, and p2 is 0 to 8;

m is an integer of 4 to 20;

u is an integer of 1 to 5, preferably 1 to 3, more preferably 1;

q and r independent of each another are an integer of 2-10, provided that r/q is equal to or larger than 1 and that t is zero or an integer of (q+r) time x which is 1.5 to 2.5.

Examples of ethoxylated silicone polyether surfactants include without limitation Silsurf® Series surfactants (e.g., Silsurf® A208, B208) from Siltech, Silube® series surfactants (e.g., Silube® J-208) from Siltech, Sylgard® 309 from Dow Corning, and those described in U.S. Pat. Nos. 5,145, 977 and 7,279,503 and US patent application publication Nos. 2003/013808 and 2010/0022660 (herein incorporated by references in their entireties), and combinations thereof. Preferably, an ethoxylated silicone polyether having a INCI name of PEG-8 Dimethicone is used in the present invention.

Generally, an ethoxylated silicone polyether surfactant has a high foaming property. Preferably, a water-based solution for washing/cleaning reusable molds further comprises a defoamer. Examples of preferred defoamers include without limitation finely powdered silica, defoaming agents from Shin Etsu (e.g., KM-7750B which contains silica particles with a medium size of about 2.6 microns as measured, or X-22-1927 which is a silicone base defoamer and does not contain silica powder), defoaming agent from BASF (e.g., BASF DF 10P MOD 12 defoamer which is an organic base defoamer which did not contain any silicon or silica powder), antifoam agents from Dow Corning, and the like. Preferably, the defoamer used in the mold cleaning solution is finely powdered silica having a particle size of about 5 microns or less, preferably about 4 microns or less, more preferably about 3 microns or less, even more preferably about 2 microns or less.

In accordance with the invention, an effective amount of a defoamer is preferably added in a water-based mold cleaning solution. The term "effective amount" used in this application means that when the defoamer is present in a given amount in a water-based mold cleaning solution and the mold cleaning solution is used in a dispensing tank equipped with re-circulating pump with the pump on for about 7 minutes and maintained at 40° C. and is spread on mold surface at a nozzle to mold edge distance of about 1.0 cm and about 50 psi with a 65° fan spread nozzle with 25° spread angle, a foam height is less than about 5 mm, preferably about 4 mm or less, more preferably about 3 mm or less, even more preferably about 2 mm or less.

In accordance with the present invention, a fluid polymerizable composition can comprise various components as known to a person skilled in the art, such as, for example, one or more hydrophilic vinylic monomers, one or more hydrophobic vinylic monomers, a photoinitiator, one or more cross-linking agents, a UV-absorbing agent, a visibility tinting agent (e.g., a dye, a pigment, or a mixture thereof), an anti-microbial agent (e.g., silver nanoparticles), a bioactive agent, a leachable lubricant, and the like, as known to a person skilled in the art. a chain transfer agent, Any hydrophilic vinylic monomer can be used in the invention. Examples of preferred hydrophilic vinylic monomers are N,N-dimethylacrylamide (DMA), N,N-dimethylmethacrylamide (DMMA), 2-acrylamidoglycolic acid, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, a $C_1$-$C_4$-alkoxy polyethylene glycol(meth)acrylate having a weight average molecular weight of up to 1500, methacrylic acid, N-vinyl formamide, N-vinyl acetamide, N-vinyl isopropylamide, N-vinyl-N-methyl acetamide, N-vinyl caprolactam, and mixtures thereof.

By incorporating a certain amount of hydrophobic vinylic monomer in a fluid composition, the mechanical properties (e.g., modulus of elasticity) of the resultant polymer may be improved. Nearly any hydrophobic vinylic monomer can be used in the invention. Examples of preferred hydrophobic vinylic monomers include methyl(meth)acrylate, ethyl (meth)acrylate, propyl(meth)acrylate, isopropyl(meth)acrylate, butyl(meth)acrylate, sec-butyl meth)acrylate, isobutyl (meth)acrylate, t-butyl(meth)acrylate, cyclohexylacrylate, 2-ethylhexylacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate, a siloxane-containing vinylic monomer as described previously, a polysiloxane-containing vinylic monomer (having 3 to 8 silicone atoms), and mixtures thereof. Most preferably, the polymerizable composition comprises a bulky hydrophobic vinylic monomer. Preferred bulky hydrophobic vinylic monomers include without limitation N-[tris(trimethylsiloxy)silylpropyl](meth)acrylamide; tris(trimethylsilyloxy)-silylpropyl methacrylate (TRIS); (3-methacryloxy-2-hydroxypropyloxy)propyl-bis(trimethylsiloxy)-methylsilane); (3-methacryloxy-2-hydroxypropyloxy)propyl-tris(trimethylsiloxy)silane; cyclohexylacrylate, isobornyl methacrylate, a polysiloxane-containing vinylic monomer (having 3 to 8 silicone atoms), and combinations thereof.

Preferred polymerizable UV absorbing agents include without limitation 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl)benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxyethylphenyl)benzotriazole, 2-(2'-hydroxy-5'-methacryloxypropylphenyl)benzotriazole, 2-hydroxy-4-acryloxy alkoxy benzophenone, 2-hydroxy-4-methacryloxy alkoxy benzophenone, allyl-2-hydroxybenzophenone, 2-hydroxy-4-methacryloxy benzophenone. A polymerizable UV-absorbing agent is generally present in the polymerizable composition for preparing a polysiloxane copolymer which is ethylenically functionalized in turn to obtain a polysiloxane prepolymer of the invention in an amount sufficient to render a contact lens, which is made from a lens forming material including the prepolymer and which absorbs at least about 80 percent of the UV light in the range of from about 280 nm to about 370 nm that impinges on the lens. A person skilled in the art will understand that the specific amount of UV-absorbing agent used in the polymerizable composition will depend on the molecular weight of the UV-absorbing agent and its extinction coefficient in the range from about 280 to about 370 nm. In accordance with the invention, the polymerizable composition comprises about 0.2% to about 5.0%, preferably about 0.3% to about 2.5%, more preferably about 0.5% to about 1.8%, by weight of a UV-absorbing agent.

A photoinitiator can initiate free radical polymerization and/or crosslinking by the use of light. Suitable photoinitiators are benzoin methyl ether, diethoxyacetophenone, a benzoylphosphine oxide, 1-hydroxycyclohexyl phenyl ketone and Darocur and Irgacure types, preferably Darocur 1173®, Irgacure 369®, Irgacure 379®, and Irgacure 2959®. Examples of benzoylphosphine oxide initiators include 2,4,6-trimethylbenzoyldiphenylophosphine oxide (TPO); bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

Cross-linking agents are compounds having two or more ethylenically unsaturated groups and having a molecular weight of less than 700 Daltons. Crosslinking agents may be used to improve structural integrity and mechanical strength. Examples of cross-linking agents include without limitation tetra(ethyleneglycol) diacrylate, tri(ethyleneglycol)diacrylate, ethyleneglycol diacylate, di(ethyleneglycol)diacrylate, tetraethyleneglycol dimethacrylate, triethyleneglycol dimethacrylate, ethyleneglycol dimethacylate, di(ethyleneglycol)dimethacrylate, trimethylopropane trimethacrylate, pentaerythritol tetramethacrylate, bisphenol A dimethacrylate, vinyl methacrylate, ethylenediamine dimethyacrylamide, glycerol dimethacrylate, triallyl isocyanurate, triallyl cyanurate, allylmethacrylate, and combinations thereof. A preferred cross-linking agent is tetra(ethyleneglycol)diacrylate, tri(ethyleneglycol)diacrylate, ethyleneglycol diacrylate, di(ethyleneglycol)diacrylate, triallyl isocyanurate, or triallyl cyanurate.

The amount of a cross-linking agent used is expressed in the weight content with respect to the total polymer and is preferably in the range from about 0.05% to about 4%, and more preferably in the range from about 0.1% to about 2%.

Examples of preferred pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom DM Handbook of U.S. Colorants for a list of colorants that may be used with the present invention. A more preferred embodiment of a pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid), non-crosllinkable hydrophilic polymers (i.e., without ethylenically unsaturated groups), one or more hydrophobic comfort agent, and a mixture thereof.

Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof. The weight-average molecular weight $M_w$ of the non-crosslinkable hydrophilic polymer is preferably from 5,000 to 1,500,000, more preferably from 50,000 to 1,200,000, even more preferably from 100,000 to 1,000,000, Daltons.

A hydrophobic comfort agent is a compound or a mixture of compounds which can strengthen and/or stabilize the tear film lipid layer. Examples of hydrophobic comfort agents include, without limitation, phospholipids, monoglycerides, diglycerides, triglycerides, glycolipids, glyceroglycolipids, sphingolipids, sphingo-glycolipids, fatty alcohols, hydrocarbons having a $C_{12}$-$C_{28}$ chain in length, wax esters, fatty acids, mineral oils, silicone oils, and combinations thereof.

Exemplary phospholipids include, without limitation, lecithin, phosphatidyl ethanolamine, lysolecithin, lysophosphatidylethanolamine, phosphatidylserine, phosphatidyl inositol, sphingomyelin, cephalin, cardiolipin, phosphatidic acid, cerebrosides, dicetyl-phosphate, phosphatidyl-choline and dipalmitoyl-phosphatidylcholine. Preferred phospholipids are phosphatidylcholine, phosphatidylethanolamine, phosphatidylserine, phosphatidylinositol, and sphingomyelin.

Glycolipids are carbohydrate-attached lipids. Exemplary glycolipids include, without limitation, glyceroglycolipids, glycosphingolipids, Gangliosides. Exemplary glyceroglycolipids include, without limitation, Galactolipids, and Sulfolipids. Glycosphingolipids are ceramides with one or more sugar residues joined in a β-glycosidic linkage at the 1-hydroxyl position. Gangliosides have at least three sugars, one of which must be sialic acid.

Exemplary sphingolipids include, without limitation, sphingomyelins. Sphingomyelins have a phosphorylcholine or phosphoroethanolamine molecule esterified to the 1-hydroxy group of a ceramide.

Exemplary fatty alcohols include, without limitation, capryl alcohol (1-octanol), 2-ethyl hexanol, pelargonic alcohol (1-nonanol), capric alcohol (1-decanol, decyl alcohol), 1-dodecanol (lauryl alcohol), myristyl alcohol (1-tetradecanol), cetyl alcohol (1-hexadecanol), palmitoleyl alcohol (cis-9-hexadecen-1-ol), stearyl alcohol (1-octadecanol), isostearyl alcohol (16-methylheptadecan-1-ol), elaidyl alcohol (9E-octadecen-1-ol), oleyl alcohol (cis-9-octadecen-1-ol), linoleyl alcohol (9Z,12Z-octadecadien-1-ol), elaidolinoleyl alcohol (9E, 12E-octadecadien-1-ol), linolenyl alcohol (9Z, 12Z,15Z-octadecatrien-1-ol), elaidolinolenyl alcohol (9E, 12E,15-E-octadecatrien-1-ol), ricinoleyl alcohol (12-hydroxy-9-octadecen-1-ol), arachidyl alcohol (1-eicosanol), behenyl alcohol (1-docosanol), erucyl alcohol (cis-13-docosen-1-ol), lignoceryl alcohol (1-tetracosanol), ceryl alcohol (1-hexacosanol), montanyl alcohol, cluytyl alcohol (1-octacosanol), myricyl alcohol, melissyl alcohol (1-triacontanol), geddyl alcohol (1-tetratriacontanol), and Cetearyl alcohol Fatty acids can be medium chain fatty acids with alphatic tails of 8 to 14 carbons or long chain fatty acids with alphatic tails of at least 16 carbons). The preferred fatty acids are long chain fatty acids. Exemplary fatty acids include, without limitation, oleic acid, stearic acid, palmytic acid myristic acid, linoleic acid, linolenic acid, arachidic acid, arachadonic acid, myristoleic acid; palmitoleic acid; oleic acid; α-linolenic acid; eicosapentaenoic acid; erucic acid; docosahexaenoic acid.

A monoglyceride is a glyceride consisting of one fatty acid chain covalently bonded to a glycerol molecule through an ester linkage, and can be broadly divided into two groups; 1-monoacylglycerols and 2-monoacylglycerols, depending on the position of the ester bond on the glycerol moiety. A diglyceride is a glyceride consisting of two fatty acid chains covalently bonded to a glycerol molecule through ester linkages. A triglyceride is glyceride in which the glycerol is esterified with three fatty acids.

In accordance with the invention, a fluid composition can be a solution or a melt at a temperature from about 20° C. to about 85° C. Preferably, a fluid composition is a solution of all desirable components in water, or an organic solvent, a mixture of water and one or more organic solvents, or a mixture of two or more organic solvents.

A fluid composition of the invention can be prepared by dissolving all of the desirable components in any suitable solvent known to a person skilled in the art. Example of suitable solvents includes without limitation, water, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

In accordance with the invention, the monomer mixture can be introduced (dispensed) into a cavity formed by a mold according to any known methods.

After the monomer mixture is dispensed into the mold, it is polymerized to produce a contact lens. Crosslinking may be initiated by exposing the monomer mixture in the mold to a spatial limitation of actinic radiation to crosslink the polymerizable components in the monomer mixture. The crosslinking according to the invention may be effected in a very short time, e.g. in ≤ about 200 seconds, preferably in ≤ about 150 seconds, more preferably in ≤100 about seconds, even more preferably in ≤ about 50 seconds, and most preferably in 5 to 30 seconds.

Opening of the mold so that the molded lens can be removed from the mold may take place in a manner known per se.

The molded contact lens can be subject to lens extraction to remove unpolymerized polymerizable components, such as, for example, vinylic monomers and/or macromers, crosslinkers, crosslinking agents. The extraction solvent can be any solvent known to a person skilled in the art. Examples of suitable extraction solvent are those described above for preparing monomer mixtures. After extraction, lenses can be hydrated in water or an aqueous solution of a wetting agent (e.g., a hydrophilic polymer).

The molded contact lenses can further subject to further processes, such as, for example, surface treatment (for example, such as, plasma treatment, chemical treatments, the grafting of hydrophilic monomers or macromers onto the surface of a lens, Layer-by-layer coating, etc.); packaging in lens packages with a packaging solution which can contain about 0.005% to about 5% by weight of a wetting agent (e.g., a hydrophilic polymer described above) and/or a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof); sterilization; and the like.

The molded contact lenses preferably have at one property selected from the group consisting of: an oxygen transmissibility (Dk/t) of preferably at least about 50 barrers/mm, more preferably at least about 60 barrers/mm, even more preferably at least about 80 barrers/mm; a lens center thickness of preferably from about 40 microns to 160 microns, more preferably from about 50 microns to 140 microns, even more preferably from about 60 microns to 120 microns; an elastic modulus of from about 0.1 MPa to about 2.0 MPa, preferably from about 0.2 MPa to about 1.5 MPa, more preferably from about 0.3 MPa to about 1.2, even more preferably from about 0.4 MPa to about 1.0 MPa; an Ionoflux Diffusion Coefficient, D, of, preferably at least about $1.0 \times 10^{-5}$ mm$^2$/min, more preferably at least about $2.0 \times 10^{-5}$ mm$^2$/min, even more preferably at least about $6.0 \times 10^{-5}$ mm$^2$/min; a water content of preferably from about 15% to about 65%, more preferably from about 20% to about 55% by weight when fully hydrated; and combinations thereof.

The invention is also related to silicone hydrogel contact lenses made according to a method of the invention.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

EXAMPLE 1

Preparation of Chain-Extended Polydimethylsiloxane Vinylic Macromer with Terminal Methacrylate Groups (CE-PDMS Macromer)

In the first step, α,ω-bis(2-hydroxyethoxypropyl)-polydimethylsiloxane (Mn=2000, Shin-Etsu, KF-6001a) is capped with isophorone diisocyanate by reacting 49.85 g of α,ω-bis(2-hydroxyethoxypropyl)-polydimethylsiloxane with 11.1 g isophorone diisocyanate (IPDI) in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM.

Alternate Preparation of CE-PDMS Macromer with Terminal Methacrylate Groups 240.43 g of KF-6001 is added into a 1-L reactor equipped with stirring, thermometer, cryostat, dropping funnel, and nitrogen/vacuum inlet adapter, and then dried by application of high vacuum ($2 \times 10^{-2}$ mBar). Then, under an atmosphere of dry nitrogen, 320 g of distilled MEK is then added into the reactor and the mixture is stirred thoroughly. 0.235 g of DBTDL are added to the reactor. After the reactor is warmed to 45° C., 45.86 g of IPDI are added through an addition funnel over 10 minutes to the reactor under moderate stirring. The reaction is kept for 2 hours at 60° C. 630 g of KF-6002 dissolved in 452 g of distilled MEK are then added and stirred until a homogeneous solution is formed. 0.235 g of DBTDL are added, and the reactor is held at 55° C. overnight under a blanket of dry nitrogen. The next day, MEK is removed by flash distillation. The reactor is cooled and 22.7 g of IEM are then charged to the reactor followed by 0.235 g of DBTDL. After 3 hours, an additional 3.3 g of IEM are added and the reaction is allowed to proceed overnight. The following day, the reaction mixture is cooled to 18° C. to obtain CE-PDMS macromer.

Lens Formulation

A lens formulation for cast-molding of silicone hydrogel contact lenses are prepared to have the following composition: 33.0% by weight of CE-PDMS prepared above; 17.0% by weight of N-[tris(trimethylsiloxy)-silylpropyl]acrylamide (TRIS-acrylamide); 24.0% by weight of N,N-dimethylacrylamide (DMA); 0.5& by weight of N-(carbonyl-methoxy-polyethylene glycol-2000)-1,2-disteaoyl-sn-glycero-3-phosphoethanolamin, sodium salt) (L-PEG 2000); 1.0% by weight of Darocur 1173; 24.5% by weight of 1-Propanol.

EXAMPLE 2

This example illustrates how to select a surfactant the aqueous solution of which can be used to effectively wash the molding surfaces of a reusable mold for cast-molding silicone hydrogel contact lenses from a lens formulation prepared in Example 1.

Aqueous solutions of various surfactants are tested for their efficacy in dissolving silicone-containing components of the lens formulation prepared in Example 1 as follows. 10 ml of DI water is measured into plastic vials. 1 drop (~20-40 mg) of a surfactant is added to the water. Then 2 drops (~60-80 mg) of CE-PDMS macromer prepared in Example 1 is added to this mixture. The samples are observed before shaking and also after vigorous shaking for their solubility in the surfactant solution. The promising candidates are further screened by adding substituting TRIS-acrylamide (40-50 mg) instead of CE-PDMS macromer.

The results of tests are reported in Table 1. Based on visual observation, 4 surfactant solutions (Tetronic 1301, Silube Silwax J-208 412, Sylgard 309, and BRIJ 30) can dissolve CE-PDMS macromer and disperse TRIS-acrylamide to form a cloudy solution (believed to be due to emulsification of TRIS-acrylamide).

TABLE 1

| | Solubility | |
|---|---|---|
| Surfactant | CE-PDMS | TRIS-Acrylamide |
| Tetronic 1301 | Yes | Yes * |
| Tetronic 1307 | Yes | No |
| Tetronic 1107 | Yes | No |
| Sulphur Dodecyl Sulphate | Yes | No |
| Pluronic F127 | Yes | No |
| Tetronic 304 | Yes | No |
| Pluronic F68 PRILL | Yes | No |
| Pluronic F87 PRILL | Yes | No |
| BRIJ 30 | Yes | Yes * |
| Sylgard 309 Silicone Surfactant # | Yes | Yes * |
| CMS-626 (Gelest) | Yes | No |
| DBP-534 (Gelest) | Yes | No |
| DBP-814 (Gelest) | Yes | No |
| DBP-821 (Gelest) | Yes | No |
| DBP-732 (Gelest) | Yes | No |
| Silube J-208 412 | Yes | Yes * |
| Silwax J-208 412 | Yes | No |
| Siltech Silwax J-208 212 | Yes | No |

* cloudy solution with small white TRIS-acrylamide particles.
From Dow Corning.

The aqueous solutions of the following surfactants fail to dissolve CE-PDMS in their tests: Pluronic F108NF, Tetronic 90R4; from Siltech, Silwax J208 612, Silwax J208 812, Silwax J208 2 ume, Silwax J208 4 ume, Silwax J208 6 ume, Silwax J208 8 ume; and from Gelest, VDT-954, YRD-122, VDT-731, CMS-222, YBD-125, CMS-832.

Aqueous solutions of isopropanol (from 5% to 20% by weight) are also tested with for their solubility of CE-PDMS and TRIS-acrylamide. 10% and 5% IPA solution show progressive decrease in the ability to dissolve CE-PDMS and TRIS with the 5% solution showing poor solubility properties. 20% IPA solution is found to be very effective in dissolving CE-PDMS into a cloudy emulsion and completely dissolving TRIS-acrylamide.

EXAMPLE 3

Various percent ethylenically-functionalized polysiloxanes are prepared as follows. KF-6001A ($\alpha,\omega$-bis(2-hydroxyethoxypropyl)-polydimethylsiloxane, Mn=2000, from Shin-Etsu) and KF-6002A ($\alpha,\omega$-bis(2-hydroxyethoxypropyl)-polydimethylsiloxane, Mn=3400, from Shin-Etsu) are separately dried at about 60° C. for 12 hours (or overnight) under high vacuum in a single neck flask. The OH molar equivalent weights of KF-6001A and KF-6002A are determined by titration of hydroxyl groups and are used to calculate the milimolar equivalent to be used in the synthesis.

A-1. Synthesis of Partially Ethylenically-Functionalized Polysiloxanes

A one-liter reaction vessel is evacuated overnight to remove moisture, and the vacuum broken with dry nitrogen. 75.00 g (75 meq) of dried KF6001A is charged to the reactor, and then 16.68 g (150 meq) of freshly distilled isophorone diisocyanate (IPDI) is added into the reactor. The reactor is purged with nitrogen and heated to 45° C. with stirring and then 0.30 g of dibutyltin dilaurate (DBTDL) is added. The reactor is sealed, and a positive flow of nitrogen is maintained. An exotherm occurs, after which the reaction mixture is allowed to cool and stir at 55° C. for 2 hours. After reaching the exotherm, 248.00 g (150 meq) of dried KF6002A is added to the reactor at 55° C. and then 100 μL of DBTDL is added. The reactor is stirred for four hours. Heating is discontinued and the reactor is allowed to cool overnight. The nitrogen bubble is discontinued and the reactor is opened to atmosphere for 30 minutes with moderate stirring. A hydroxyl-terminated polysiloxane having 3 polysiloxane segments, HO-PDMS-IPDI-PDMS-IPDI-PDMS-OH is formed.

For 80% ethylenically-functionalized polysiloxane, 18.64 g (120 meq) of isocyanatoethyl methacrylate (IEM) is added to the reactor, along with 100 μL of DBTDL. The reactor is stirred for 24 hours, and then product is decanted and stored under refrigeration. For preparation of various percentage of ethylenically functionalization of a polysiloxane, various quantities of IEM are applied according following Table 1.

TABLE 1

| | % Ethylenical Functionalization of Polysiloxane | Wt. of IEM |
|---|---|---|
| A-1.1 | 60% | 13.98 g (90 mEq) |
| A-1.2 | 70% | 16.31 g (105 meq) |
| A-1.3 | 80% | 18.64 g (120 meq) |
| A-1.4 | 100% | 23.30 g (150 meq) |

A-2. 100% (Fully) Ethylenically Functionalized Polysiloxane:

A one-liter reaction vessel is evacuated overnight to remove moisture, and the vacuum broken with dry nitrogen. 75.00 g (75 meq) of dried KF6001A is charged to the reactor and dried at 60° C. under high vacuum for 8 hours, and then 23.30 g (150 meq) of IEM is added to the reactor under nitrogen. After 30 minutes of stirring, 0.2 g of DBTDL is added to the mixture. The reactor is stirred at 25±3° C. for about 4 hours, and then product is decanted and stored under refrigeration.

EXAMPLE 4

This example illustrates the effects of percentage of ethylenically-functionalization of polydisloxane, which is used to prepare a prepolymer that in turn is used to prepare lens formulation, upon the viscosities of the lens formulations.

B-1. Synthesis of Amphiphilic Branched Copolymer

A 1-L jacketed reactor is equipped with 500-mL addition funnel, overhead stirring, reflux condenser with nitrogen/vacuum inlet adapter, thermometer, and sampling adapter. 48.55 g of partially ethylenically-functionalized polysiloxane (PDMS) prepared in Example 3, A-1.1 is charged to the reaction vessel. The PDMS A-1.1 is degassed under vacuum less than 1 mbar at room temperature for 30 minutes. After the degassed is accomplished, the reactor is filled with nitrogen gas waiting for further process. The monomer solution composed of 26.06 g of N,N-dimethylacrylamide (DMA), 23.14 g of (tris(trimethylsilyl))siloxypropyl)-methacrylamide (TRIS-Am), and 350 g of ethyl acetate is charged to the 500-mL addition funnel followed with a degas under vacuum 100 mbar at room temperature for 10 minutes and then refilled with nitrogen gas. The monomer solution is degassed with same conditions for additional two cycles. The monomer solution is then charged to the reactor. The reaction mixture is heated to 64° C. with stirring. While heating, a solution composed of 1.75 g of mercaptoethanol (chain transfer agent, CTA) and 0.30 g of azoisobutyronitrile (Initiator) and 50 g of ethyl acetate is charged to the addition funnel followed by same degassing process as the monomer solution. When the reactor temperature reaches 64° C., the initiator/CTA solution is also added to reactor. The reaction is performed at 64° C. for 6 hours. After the copolymerization is completed, reactor temperature is cooled to room temperature.

B-2. Synthesis of Amphiphilic Branched Prepolymer

The copolymer solution prepared above (B-1) is ethylenically functionalized to form an amphiphilic branched prepolymer by adding 4.52 g of IEM (or an amount shown in Table 2) and 0.15 g of DBTDL. The mixture is stirred at room temperature under a sealed condition for 12 hours. The prepared prepolymer is then stabilized with 100 ppm of hydroxyl-tetramethylene piperonyloxy. After the reaction solvent is exchanged to 1-propanol, the solution is ready to be used for formulation. Various amphiphilic branched prepolymers are prepared with various combination of various % ethylenically-functionalized polysiloxane, CTA levels and IEM as indicated in Table 2.

TABLE 2

| Amphiphilic Branched Prepolymer | % ethylenically-functionalized polysiloxane | CTA % | IEM |
|---|---|---|---|
| B-2a | Example 3, A-1.1 (60%) | 1.75% | 4.52 g |
| B-2b | Example 3, A-1.2 (70%) | 1.75% | 4.35 g |
| B-2c | Example 3, A-1.3 (80%) | 1.75% | 4.17 g |
| B-2d | Example 3, A-1.4 (100%) | 1.75% | 3.83 g |
| B-2e | Example 3, A-1.1 (60%) | 1.25% | 3.43 g |
| B-2f | Example 3, A-1.2 (70%) | 1.25% | 3.25 g |
| B-2g | Example 3, A-1.3 (80%) | 1.25% | 3.08 g |

B-3: Preparation of Lens Formulations

Lens formulations are prepared by dissolving an amphiphilic branched prepolymer prepared above (B-2a to B-2g) and other components shown in Table 3. Other ingredients in each formulation include 1.0% of DC1171, 0.75% of DMPC and 23.25% of 1-PrOH. Photorheologys of the prepared lens formulations are cured by UV with an intensity of 16 mW/cm$^2$ with 330 nm filter and also summarized in Table 3.

TABLE 3

| Lens Formulation | | | Photorheology | | |
|---|---|---|---|---|---|
| Amphiphilic Branched Prepolymer | DMA | TRIS-Am* | Curing Time, seconds | G' kPa | Viscosity mPa·s |
| 65% of B-2a | 5.3% | 4.7% | 19 | 90 | 1020 |
| 65% of B-2b | 5.3% | 4.7% | 17 | 100 | 1850 |
| 65% of B-2c | 5.3% | 4.7% | 16 | 110 | 2720 |
| 65% of B-2d | 5.3% | 4.7% | 16 | 90 | 3150 |
| 65% of B-2e | 5.3% | 4.7% | 15 | 100 | 2100 |
| 65% of B-2f | 5.3% | 4.7% | 14 | 105 | 3280 |
| 65% of B-2g | 5.3% | 4.7% | 16 | 105 | 5900 |

*(tris(trimethylsilyl))siloxypropyl)-acrylamide (TRIS-Am)

EXAMPLE 5

C-1: Synthesis of Amphiphilic Branched Copolymer

A 4-L jacketed reactor is equipped with overhead stirring, reflux condenser with nitrogen/vacuum inlet adapter, thermometer, and sampling adapter. A mixture of 78.35 g of partially ethylenically-functionalized polysiloxane prepared in Example 3, A-1.3 and 8.71 g of Example 3, A-2 is charged to the 4-L reactor and then degassed under vacuum less than 10 mbar at room temperature for 30 minutes. After the degassing, the reactor is filled with nitrogen gas waiting for further process. The monomer solution composed of 52.51 g of DMA, 56.65 g of TRIS-Am and 390 g of cyclohexane is transferred to the reactor. The final mixture is degassed at 100 mbar for 5 minutes and then refilled with nitrogen gas. This degas cycle is repeated for 4 more times. The reaction mixture is then heated to 64° C. followed by adding a degassed initiator/CTA solution composed of 0.60 g of V-601, 7.50 g of mercaptoethanol and 10 g of THF. The copolymerization is performed at 64° C. under nitrogen for totally 6 hours. After reaction is finished, reactor temperature is cooled to room temperature.

C-2. Synthesis of Amiphiphilic Branched Prepolymer

The copolymer solution prepared above (C-1) is ethylenically functionalized to form an amphiphilic branched prepolymer by adding 7.50 g of IEM and 0.21 g of DBTDL, followed by an agitation under a sealed dry condition at room temperature for 48 hours. The prepared prepolymer is then stabilized with 100 ppm of hydroxy-tetramethylene piperonyloxy. After the reaction solvent is exchanged to 1-propanol, the solution is ready to be used for formulation.

C-3: Preparation of Lens Formulations and Photorheology

The amphiphilic branched prepolymer prepared above (C-3) is formulated with final compositions listed in Table 4. Photorheology of prepared formulations are cured by UV with intensity 16 mW/cm$^2$ with 330 nm filter.

TABLE 4

| Formulation | | | | | | Photorheology | | |
|---|---|---|---|---|---|---|---|---|
| Lot# | C-2 | DMA | DC1173 | DMPC | 1-PrOH | Curing Time (s) | G' kPa | Viscosity mPa·s |
| C-3.1 | 69% | 6% | 1.0% | 0.75% | 23.25% | 19 | 115 | 3200 |
| C-3.2 | 70% | 5% | 1.0% | 0.75% | 23.25% | 21 | 114 | 3400 |

DMPC: 1,2-dimyristoyl-sn-glycero-3-phosphocholine;
DC1173: Darocur 1173

EXAMPLE 6

D-1. Synthesis of Amphiphilic Branched Copolymer

A 1-L jacketed reactor is equipped with 500-mL addition funnel, overhead stirring, reflux condenser with nitrogen/vacuum inlet adapter, thermometer, and sampling adapter. 45.60 g of partially ethylenically-functionalized polysiloxane prepared in Example 3, A-1.3 is charged to the reaction vessel and then degassed under vacuum less than 1 mbar at room temperature for 30 minutes. After the degassing, reactor is filled with nitrogen gas waiting for further process. The monomer solution composed of 0.65 g of hydroxyethyl methacrylate (HEMA), 25.80 g of DMA, 27.80 g of 3-[Tris(trimethylsiloxy)silyl]propyl methacrylate (TRIS), and 279 g of ethyl acetate is charged to the 500-mL addition funnel followed with a degas under vacuum 100 mbar at room temperature for 10 minutes and then refilled with nitrogen gas. The monomer solution is degassed with same conditions for additional two cycles. The monomer solution is then charged to the reactor. The reaction mixture is heated to 67° C. with stirring. While heating, a solution composed of 1.50 g of mercaptoethanol (CTA) and 0.26 g of azoisobutyronitrile(initiator) and 39 g of ethyl acetate is charged to the addition funnel followed by same degas process as the monomer solution. When the reactor temperature reaches 67° C., the initiator/CTA solution is also added to reactor. The reaction is performed at 67° C. for 8 hours. After the copolymerization is completed, reactor temperature is cooled to room temperature.

D-2. Synthesis of Amiphiphilic Branched Prepolymer

The copolymer solution prepared above (D-1) is ethylenically functionalized to form an amphiphilic branched prepolymer by adding 4.45 g of IEM in the presence of 0.21 g of DBTDL. The mixture is stirred at room temperature under a sealed condition for 24 hours. The prepared macromonomer is then stabilized with 100 ppm of hydroxy-tetramethylene piperonyloxy before the solution is concentrated to 200 g (~50%) and filtered through 1 um pore size filter paper. The solid content is measured via removing the solvent at vacuum oven at 80° C. After the reaction solvent is exchanged to 1-propanol, the solution is further concentrated to the desired concentration and ready to be used for preparing lens formulations.

It is understood that isocyanatoethyl acrylate can be replaced with isocyanatoethyl methacrylate to prepare UV-absorbing prepolymer containing methacrylate groups.

D-3. Preparation of Lens Formulation and Photorheology

A lens formulation is prepared to have the following composition: 72% by weight of prepolymer D2 prepared above; 6% by weight of DMA; 1% by weight of DC1173; 0.75% by weight of DMPC; and 20.25% by weight of 1-PrOH. Photorheology is studied by using the Hamamatsu lamp with a 330 nm long pass cutoff filter placed just before the sample. The intensity (16 mW/cm$^2$) is measured by using an IL1700 detector using a SED005 sensor with a 297 nm cutoff filter from International light, the long pass filters are place before the sample for curing the formulation. The results of photorheology study are: a curing time of about 12 seconds, G' of 165 kPa, and a viscosity of 5550 mPa·s.

EXAMPLE 7

E-1: Synthesis of UV-absorbing Amphiphilic Branched Copolymer

A 1-L jacketed reactor is equipped with 500-mL addition funnel, overhead stirring, reflux condenser with nitrogen/vacuum inlet adapter, thermometer, and sampling adapter. 45.98 g of partially ethylenically functionalized polysiloxane prepared in Example 3, A-1.3 is charged to the reaction flask and then degassed under vacuum less than 1 mbar at room tempertaure for 30 minutes. The monomer solution prepared by mixing 0.51 g of HEMA, 25.35 g of DMA, 1.38 g of Norbloc methacrylate, 26.03 g of TRIS, and 263 g of ethyl acetate is charged to the 500-mL addition funnel followed with a degas under vacuum 100 mbar at room temperature for 10 minutes and then refilled with nitrogen gas. The monomer solution is degassed with same conditions for additional two cycles. The monomer solution is then charged to the reactor. The reaction mixture is heated to 67° C. with adequate stirring. While heating, a solution composed of 1.48 g of mercaptoethanol (chain transfer agent, CTA) and 0.26 g of azoisobutyronitrile(initiator) and 38 g of ethyl acetate is charged to the addition funnel followed by same degas process as the monomer solution. When the reactor temperature reaches 67° C., the initiator/CTA solution is also added to reactor. The reaction is performed at 67° C. for 8 hours. After the copolymerization is completed, reactor temperature is cooled to room temperature.

E-2: Synthesis of UV-Absorbing Amphiphilic Branched Prepolymer

The copolymer solution prepared above (E-1) is ethylenically functionalized to form an amphiphilic branched prepolymer by adding 3.84 g of IEM in the presence of 0.15 g of DBTDL. The mixture is stirred at room temperature under a sealed condition for 24 hours. The prepared prepolymer is then stabilized with 100 ppm of hydroxy-tetramethylene piperonyloxy before the solution is concentrated to 200 g (~50%) and filtered through 1 um pore size filter paper. After the reaction solvent is exchanged to 1-propanol, the solution is ready to be used for formulation. The solid content is measured via removing the solvent at vacuum oven at 80° C.

It is understood that isocyanatoethyl acrylate can be replaced with isocyanatoethyl methacrylate to prepare UV-absorbing prepolymer containing methacrylate groups.

E-3: Preparation of Lens Formulation and Photorheology

A lens formulation is prepared to have the following composition: 71% by weight of prepolymer E2 prepared above; 4% by weight of DMA; 1% by weight of TPO; 0.75% by weight of DMPC; and 23.25% by weight of 1-PrOH. Photorheology is studied by using the Hamamatsu lamp with a stack of 330 nm and 388 nm long pass cutoff filters placed just before the sample. The intensity (4.6 mW/cm$^2$) is measured by using an IL1700 detector using a SED005 sensor with a 297 nm cutoff filter from International light, the long pass filters are place before the sample for curing the formulation. The results of photorheology study are: a curing time of about 22 seconds, G' of 155 kPa, and a viscosity of 2900 mPa·s.

EXAMPLE 8

Cast Molding of Silicone Hydrogel Lenses under a Spatial Limitation of Actinic Radiation Lenses are prepared by cast-molding of a lens formulation prepared in one of Examples 1 and 5-7 in a reusable mold, similar to the mold shown in FIGS. 1-6 in U.S. Pat. Nos. 7,384,590 and 7,387,759 (FIGS. 1-6). The mold comprises a female (front curve) mold half made of glass and a male (base curve) mold half made of V38 quartz. The UV irradiation source is a Hamamatsu lamp with the WG335+TM297 cut off filter at an intensity of about 4 mW/cm$^2$. The lens formulation in the mold is irradiated with UV irradtion for about 28 seconds. After opening the mold and removing the molded lens from the mold, the molding surfaces of the male (base curve) and female (front curve) mold halves are washed as described below.

Cleaning and Foaming Characteristics of Mold Cleaning Aqueous Solutions

The foaming properties of mold cleaning solutions have been determined. A mold cleaning solution containing 0.714% by weight of Silsurf B208 can have a foam height of about 26 mm when the mold solution is used in dispensing tank equipped with re-circulating pump with the pump on for about 7 minutes and maintained at 40° C. and is spread on mold surface at a nozzle to mold edge distance of about 1.0 cm and about 50 psi with a 65° fan spread nozzle with 25° spread angle. When about 0.1429% of defoamer KM-7750B from ShinEtsu is added to the mold cleaning solution above and under the identical experimental conditions, a foam height of about 1 mm is achieved. It is found that foaming of a mold cleaning solution containing 0.714% by weight of Silsurf B208 is manageable (a foam height of less than about 3 mm) in the presence of about 0.0357% by weight of defoamer KM-7750B from Shin Etsu when pump and nozzle are used intermittently (non-continuously) and that 0.1429% of defoamer KM-7750B from ShinEtsu can be used to suppress spread foam of a mold cleaning solution containing 0.714% by weight of Silsurf B208 from SilTech when pump and nozzle are used continuously.

BASF DF 10P MOD 12 defoamer has limited defoaming property because even when it is present in an amount of about 0.28% by weight, the foam height is about 7 mm under the testing conditions described above.

Silsurf A208, lower molecular weight version of Silsurf B208, is also has same cleaning capability as B208 with higher foaming property. Higher concentration (about 0.22% of defoamer KM-7750B from ShinEtsu is required to suppress spread foam of the mold cleaning solution containing 0.714% by weight of Silsurf A208.

Silsurf C208 and B608, higher molecular weight version of B208, have no cleaning capability. ShinEtsu KF-643 has limited cleaning capability with very high foaming property. ShinEtsu KF-6011 and F-518 have no cleaning capability. 1% Wilbur-Ellis Sylgard 309 is able to clean off Nelsee formulation@50° C. with high foaming problem.

Mold Cleaning

A water based mold cleaning solution is prepared by mixing about 100 ml of Silsurf® B208 (from SilTech), about 20 ml of KM-7750B defoamer (from Shin Etsu), and about 1.4 gm of NaHCO$_3$ with about 14 liters of DI water. Overhead mixer is used to agitate the mold cleaning solution for about 10 minutes prior to use.

About 12 liters of the mold solution is used in dispensing tank equipped with re-circulating pump and maintained at 40° C.

A 65° fan spread nozzle with 0° tilt angle in a first washer with re-circulated mold cleaning solution at 40° C. is used to wash front curve (FC) and base curve (BC) molds for about 30 seconds. About 2,025 ml of re-circulated mold cleaning solution at 40° C. is spread on mold surface at ~50 psi then returned to dispensing tank. Nozzle to mold edge distance is ~0.8 cm for FC mold and ~0.4 cm for BC mold.

A 65° fan spread nozzle with ~30° tilt angle in a second washer with 40° C. fresh DI water is used to rinse the washed FC and BC molds for about 20 seconds. About 1,350 ml of 40° C. fresh DI water is spread on mold surface at ~50 psi. Nozzle to mold edge distance is ~1.3 cm for FC mold and ~0.4 cm for BC mold.

A multi-channel flat fan nozzle with 10° tilt angle in a third washer with nitrogen is used to dry FC and BC molds for about 7 seconds at 80 psi. Nozzle to mold edge distance is ~1.0 cm for FC mold and ~0.5 cm for BC mold.

During the operations (washing, rinsing, and drying) described above, mold holder (for FC and BC molds) is turning at 6 seconds per rotation.

The molds are inspected with 40× stereo zoom microscope at the end of the testing days to ensure the mold cleanness. It is found that the 40° C. re-circulated mold cleaning aqueous solution prepared above is capable to clean off residues of the various silicone hydrogel lens formulations tested from molds which have been used to cast mold silicone hydrogel contact lenses from the silicone hydrogel lens formulations.

What is claimed is:

1. A method for producing silicone hydrogel contact lenses, comprising the steps of:
    (1) providing a reusable mold for making soft contact lenses, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces;
    (2) introduce a fluid polymerizable composition into the cavity, wherein the fluid polymerizable composition comprises at least one silicone-containing lens-forming material selected from the group consisting of a siloxane-containing vinylic monomer, a polysiloxane-containing vinylic monomer, a polysiloxane-containing macromer, a polysiloxane-containing crosslinker, an actinically-crosslinkable silicone-containing prepolymer, and a mixture thereof;
    (3) irradiating, under a spatial limitation of actinic radiation, the fluid composition in the mold for a time period of about 200 seconds or less, so as to form a silicone hydrogel contact lens, wherein the formed silicone hydrogel contact lens comprises an anterior surface defined by the first molding surface, an opposite posterior surface defined by the second molding surface, and a lens edge defined by the spatial limitation of actinic radiation;
    (4) opening the mold and removing the formed silicone hydrogel contact lens from the mold;
    (5) removing the silicone-containing lens forming material and other components of the fluid composition left behind on the first and second molding surfaces of the mold by washing the first and second molding surfaces of the reusable mold with a water-based solution containing from about 0.01% to about 2.5% by weight of a silicone surfactant, wherein the silicone surfactant is an ethoxylated water-soluble polyether; and
    (6) repeating the steps (2) to (5).

2. The method of claim 1, wherein the ethoxylated water-soluble silicone polyether is a linear block copolymer of polyethylenglycol with polydimethylsiloxane of formula (1), a pendant polyethylenglycol dimethicone of formula (2), or a silicone glycol of formula (3)

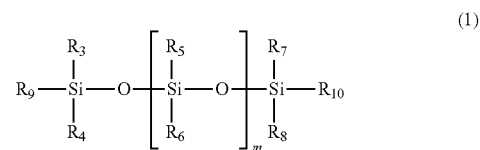

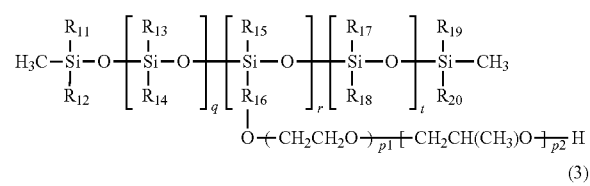

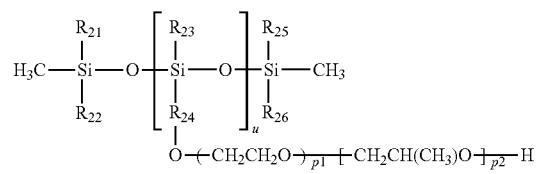

In which:
  $R_3$, $R_4$, $R_5$, $R_6$, $R_7$, $R_8$, $R_{11}$, $R_{12}$, $R_{13}$, $R_{14}$, $R_{15}$, $R_{18}$, $R_{19}$, $R_{20}$, $R_{21}$, $R_{22}$, $R_{23}$, $R_{25}$, and $R_{26}$, independent of one another are $CH_3$ or $CH_2CH_3$;
  $R_9$ and $R_{10}$ independent of each other are a monovalent radical of

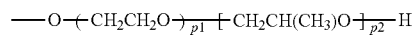

in which p1 is an integer of 6 to 12, and p2 is 0 to 8;
  $R_{16}$, and $R_{24}$ independent of one another are divalent radical of $-(CH_2)_a-$ in which a is an integer of 1 to 5;
  $R_{17}$ is $CH_3$ or a monovalent radical of $-(CH_2)_b-CH_3$ in which b is an integer from 9 to 15;
  p1 is an integer of 6 to 12, and p2 is 0 to 8;
  m is an integer of 4 to 20;
  u is an integer of 1 to 5;
  q and r independent of each another are an integer of 2-10, provided that r/q is equal to or larger than 1 and that t is zero or an integer of (q+r) time x which is 1.5 to 2.5.

3. The method of claim 2, wherein the water-based solution further comprises an effective amount of a defoaming agent.

4. The method of claim 3, wherein the defoaming agent comprises finely powdered silica having a particle size of about 5 microns or less.

5. The method of claim 3, wherein the fluid polymerizable composition comprises a siloxane-containing vinylic monomer and a polysiloxane-containing vinylic monomer or macromer or crosslinker.

6. The method of claim 3, wherein the siloxane-containing vinylic monomer is N-[tris(trimethylsiloxy)silylpropyl](meth)acrylamide, N-[tris(dimethylpropylsiloxy)silylpropyl](meth)acrylamide, N-[tris(dimethylphenylsiloxy)silylpropyl]acrylamide, N-[tris(dimethylphenylsiloxy)silylpropyl](meth)acrylamide, N-[tris(dimethylethylsiloxy)silylpropyl](meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl] acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl) acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)-propyloxy)propylbis(trimethylsiloxy)methylsilane, N-2-methacryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl -siloxy)silane, 3-[tris(trimethylsiloxy)silyl]propylvinyl carbamate, 3-[tris(trimethylsiloxy)silyl]propyl allyl carbamate, 3-[tris(trimethylsiloxy)silyl]propyl vinyl carbonate, t-butyldimethyl-siloxyethyl vinyl carbonate; trimethylsilylethyl vinyl carbonate, trimethylsilylmethyl vinyl carbonate), or combinations thereof.

7. The method of claim 3, wherein the siloxane-containing vinylic monomer is N-[tris(trimethylsiloxy)silylpropyl](meth)acrylamide, tris(trimethylsilyloxy)silylpropyl methacrylate, 3-methacryloxy-2-hydroxypropyloxy)propyl-bis(trimethylsiloxy)methylsilane, or combinations thereof.

8. The method of claim 3, wherein the fluid polymerizable composition comprises an actinically-crosslinkable silicone-containing prepolymer.

9. The method of claim 3, wherein at least one of the first and second molding surfaces is permeable to a crosslinking radiation.

10. The method of claim 9, wherein the reusable mold comprises a mask which is fixed on the mold half having the radiation-permeable molding surface.

11. The method of claim 10, wherein the fluid polymerizable composition comprises a hydrophilic vinylic monomer selected from the group consisting of N,N-dimethylacrylamide, N,N-dimethylmethacrylamide, 2-acrylamidoglycolic acid, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethylmethacrylate, 2-hydroxyethyl acrylate, hydroxypropyl acrylate, hydroxypropyl methacrylate, trimethylammonium 2-hydroxy propylmethacrylate hydrochloride, aminopropyl methacrylate hydrochloride, dimethylaminoethyl methacrylate, glycerol methacrylate, N-vinyl-2-pyrrolidone, allyl alcohol, vinylpyridine, a $C_1$-$C_4$-alkoxy polyethylene glycol (meth)acrylate having a weight average molecular weight of up to 1500, methacrylic acid, N-vinyl formamide, N-vinyl acetamide, N-vinyl isopropylamide, N-vinyl-N-methyl acetamide, N-vinyl caprolactam, and mixtures thereof.

12. The method of claim 11, wherein the fluid polymerizable composition comprises one or more hydrophobic comfort agents selected from the group consisting of phospholipid, monoglyceride, diglyceride, triglyceride, glycolipid, glyceroglycolipid, sphingolipid, sphingo-glycolipid, fatty alcohol, hydrocarbon having a $C_{12}$-$C_{28}$ chain in length, wax ester, fatty acid, mineral oil, silicone oil, and combinations thereof.

13. The method of claim 12, wherein the hydrophobic comfort agents comprises a phospholipid.

14. The method of claim 11, wherein the fluid polymerizable composition comprises polyglycolic acid and/or a noncrosllinkable hydrophilic polymer having a weight-average molecular weight $M_w$ of from 5,000 to 1,500,000 Daltons.

15. The method of claim 11, wherein the fluid polymerizable composition comprises a bioactive agent selected from the group consisting of rebamipide, ketotifen, olaptidine, cromoglycolate, cyclosporine, nedocromil, levocabastine, lodoxamide, ketotifen, 2-pyrrolidone-5-carboxylic acid glycolic acid, lactic acid, malic acid, tartaric acid, mandelic acid, citric acids, linoleic acid, gamma linoleic acid, vitamins, and combinations thereof.

* * * * *